United States Patent Office 3,753,892
Patented Aug. 21, 1973

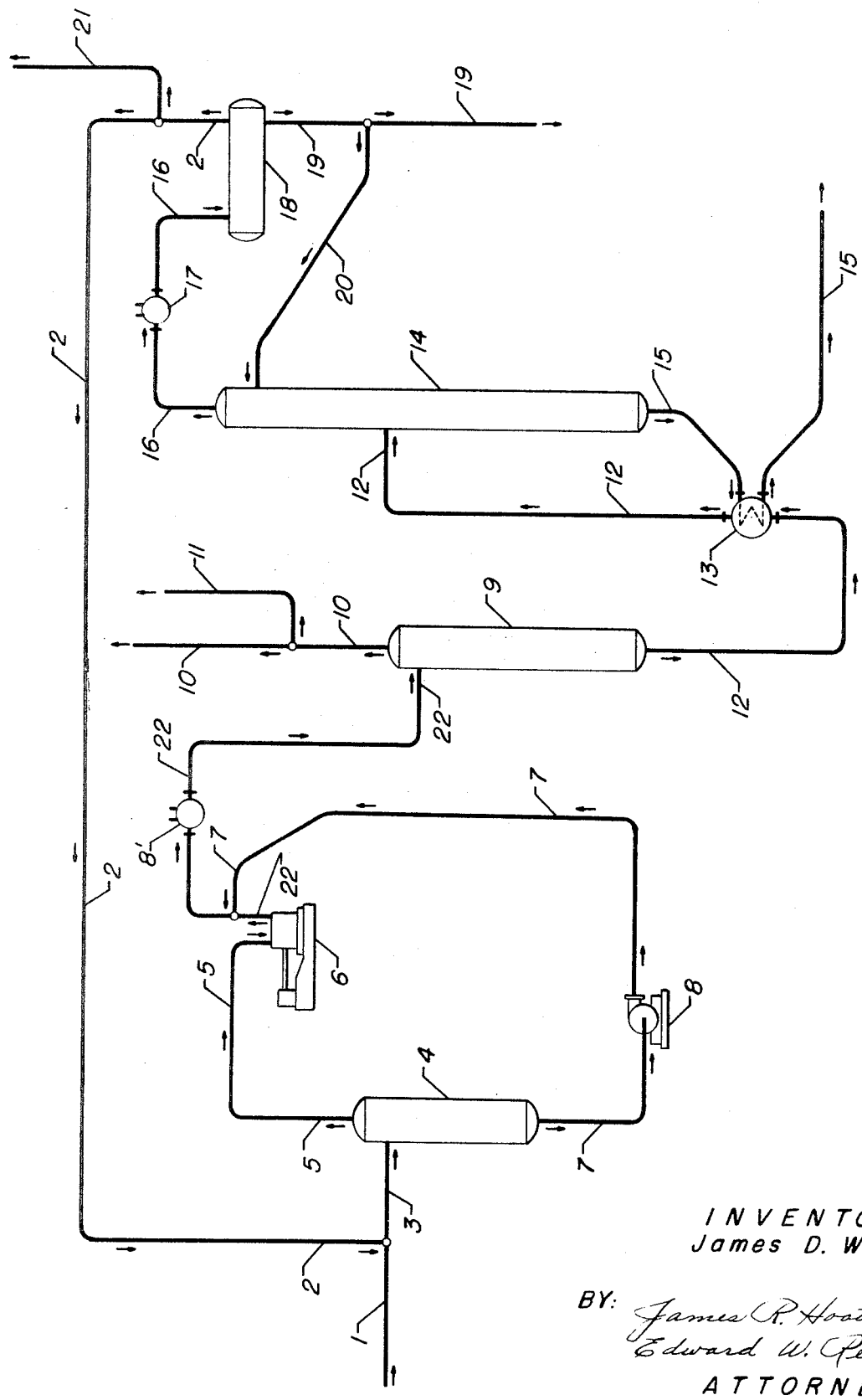

3,753,892
HYDROCARBON-HYDROGEN SEPARATION
METHOD
James D. Weith, Des Plaines, Ill., assignor to Universal
Oil Products Company, Des Plaines, Ill.
Filed May 27, 1971, Ser. No. 147,563
Int. Cl. C10g 7/02
U.S. Cl. 208—102                    11 Claims

ABSTRACT OF THE DISCLOSURE

In a process for the separation of hydrogen, normally gaseous hydrocarbons and normally liquid hydrocarbons from a hydrocarbon conversion zone effluent wherein the effluent is first separated in a first separation zone to produce a hydrogen phase and a liquid phase and the liquid phase is subsequently separated to produce a normally liquid stream, a $C_1$–$C_4$ gaseous stream and a liquid $C_3$–$C_4$ (LPG) stream, the recovery of $C_3$–$C_4$ hydrocarbons, as liquid, is increased by passing a portion of the $C_1$–$C_4$ stream to the first separation zone.

BACKGROUND OF THE INVENTION

The present invention relates to an improvement in the separation of the effluent from a hydrocarbon conversion zone. More particularly, the present invention relates to an improvement in the separation of the effluent from a catalytic reforming zone wherein increased amounts of liquefied petroleum gas are recovered as a separate product stream.

It is well known to those trained in the refining art that high quality, gasoline boiling range products, including aromatic hydrocarbons such as benzene, toluene and xylenes, may be produced by a catalytic reforming process wherein a naphtha containing feedstock is passed over a platinum containing catalyst in the presence of hydrogen, so as to convert at least a portion of the naphtha containing feedstock into aromatic hydrocarbons. One of the predominant reactions in a catalytic reforming reaction involves the dehydrogenation of naphthetic hydrocarbons. This results in a net excess of hydrogen being produced in the reforming process which is available for other refinery uses, such as hydrodesulfurization, hydrocracking and the like. Further, a considerable portion of the hydrogen produced in the reforming reaction is required for recycle purposes in order that a proper partial pressure of hydrogen be maintained over the platinum containing catalyst contained in the catalytic reforming zone. As a consequence, it is necessary to separate at least a portion of the hydrogen gas from the effluent from a catalytic reforming zone before the hydrogen can be utilized for recycle or other refinery purposes. Often, this function is performed in the prior art by flash separation of the catalytic reforming zone effluent or by performing a vapor liquid separation of the reforming zone effluent after the effluent has been cooled. In certain instances, a portion of the reformate product may be recycled to the separation zone wherein the hydrogen is separated from the reforming zone effluent to enhance the purity of the hydrogen recovered.

Another reaction which occurs in a catalytic reforming reaction is hydrocracking which segments hydrocarbons into relatively low molecular weight hydrocarbons, such as normally gaseous hydrocarbons such as methane, ethane, propane, butane, isobutane and the like. In particular, $C_1^+$ hydrocarbons are contained in the effluent from the reforming reaction zone which, if continuously recycled with the gaseous hydrogen, would build up in the system and act as a contaminant. As a consequence, these hydrocarbons must be separated from the reforming zone effluent. These normally gaseous hydrocarbons, however, in spite of being a potential contaminant in the hydrogen recycle stream, have utility in and of themselves and it is desirable to recover these normally gaseous hydrocarbons in as high concentration as possible. In particular, the $C_3$ and $C_4$ hydrocarbons are useful as feedstocks for alkylation reactions or for certain other reactions such as polymerization. Further, $C_3$ and $C_4$ hydrocarbons are also useful as liquefied petroleum gas (LPG) which find utilization as fuel in certain portions of the world. All of these normally gaseous hydrocarbons must, therefore, be separated from the effluent of a hydrocarbon conversion zone such as catalytic reforming, to obtain the maximum economic benefits from a given process.

In addition to catalytic reforming, there are other carbon conversion processes which produce normally gaseous hydrocarbons which are desirably recovered in varying amounts. For example, hydrocracking reactions, catalytic cracking reactions, thermal cracking reactions, hydrocarbon isomerizations, and the like, often produce commercially desirable quantities of these normally gaseous hydrocarbons. Therefore, it is desirable to provide efficient methods for separating the effluent from hydrocarbon conversion zones into the particular products desired, such as, for example, in catalytic reforming, to separate the effluent into a hydrogen stream, a normally gaseous hydrocarbon product stream and a gasoline boiling range product, comprising normally liquid hydrocarbons.

SUMMARY OF THE INVENTION

Therefore, it is an object of the present invention to provide an improvement in the methods presently utilized to separate the effluent from a hydrocarbon conversion zone.

More specifically, it is an object of the present invention to increase the amount of normally gaseous $C_3$ and $C_4$ hydrocarbons recovered from the effluent from a hydrocarbon conversion zone, particularly when the conversion zone is a catalytic reforming zone.

In an embodiment, therefore, the present invention relates to an improvement in existing processes for the separation of hydrogen, normally gaseous hydrocarbons and normally liquid hydrocarbons from a hydrocarbon conversion effluent to recover liquefied petroleum gas, such as the separation of the effluent from a catalytic reforming zone. This effluent is separated in a first separation zone such as a flash zone or a relatively low pressure separation zone, to produce a first gaseous stream comprising hydrogen and a first liquid stream comprising normally liquid hydrocarbons and normally gaseous hydrocarbons. The first liquid stream is separated in a second separation zone, such as a fractional distillation zone to produce a second gaseous stream comprising $C_1$–$C_4$ normally gaseous hydrocarbons, a liquefied petroleum gas stream comprising $C_3$–$C_4$ hydrocarbons and a normally liquid hydrocarbon stream. The particular improvement comprises passing a portion of the second gaseous stream to the first separation zone whereby additional amounts of $C_3$ and $C_4$ hydrocarbons are recovered in the liquefied petroleum gas stream. More particularly in the case of a non-hydrogen producing process, and in particular, a hydrogen consuming process such as hydrocracking, about 70% to about 90% of the second gaseous stream is passed to the first separation zone. In the instance of a hydrogen producing process, however, 100% of the off-gas stream may be passed to the first separation zone.

In a more limited embodiment, the present invention relates to an improvement in an existing process for the separation of hydrogen, normally gaseous hydrocarbons and normally liquid hydrocarbons from a hydrocarbon conversion zone effluent, such as the effluent from a catalytic reforming unit, to recover liquid petroleum gas. In this process the effluent is first separated in a low pressure separation zone maintained at substantially the same pressure as the pressure of the hydrocarbon conversion zone to produce a first gaseous stream comprising hydrogen and normally gaseous hydrocarbons and a first liquid stream comprising normally liquid hydrocarbons and normally gaseous hydrocarbons. The first gaseous stream is compressed to a relatively high pressure, preferably at least 50 p.s.i. higher than the pressure of the low pressure separation zone, and admixed with the first liquid stream. The resultant mixture is separated in a high pressure separation zone to produce a hydrogen enriched second gaseous stream and a liquid stream comprising normally liquid hydrocarbons and normally gaseous hydrocarbons. This second liquid stream is separated, typically by fractional distillation, to produce a third gaseous stream comprising $C_1$–$C_4$ normally gaseous hydrocarbons, a liquefied petroleum gas stream comprising $C_3$ and $C_4$ hydrocarbons and a normally liquid hydrocarbon stream. The particular improvement comprises passing a portion of the third gaseous stream, preferably about 70% to about 90% of this stream when the hydrocarbon conversion is hydrogen consuming, and 100% when hydrogen producing, to the low pressure separation zone whereby additional amounts of $C_3$ and $C_4$ hydrocarbons are recovered in the liquefied petroleum gas stream.

Other objects, embodiments and a more detailed description of the foregoing embodiments will be found in the following more detailed description of the present invention.

DETAILED DESCRIPTION OF THE INVENTION

The broad art of hydrocarbon conversion and the specific art of catalytic reforming are generally well known to those trained in the art and need not be discussed in great detail herein. For illustrative purposes, the improvement of the present invention will be described with reference to a catalytic reforming process since the inventive concept is particularly suitable for application therein, although it is to be clearly understood that the present invention provides a broad improvement in the separation of the effluent from any type of hydrocarbon conversion zone wherein the effluent is to be separated into a predominantly hydrogen stream, a liquefied $C_3$ and $C_4$ stream and a normally liquid hydrocarbon stream. Hence, the present invention has application in separating the effluent from a hydrocracking zone, a hydroisomerization zone, and the like.

The unique feature of the present invention may be best understood by discussing the prior art schemes on which the present invention is an improvement. One scheme utilized by the art is to pass the conversion zone effluent to a flash zone, typically maintained at a pressure substantially less than the pressure imposed on the conversion zone and usually about 50 to about 100 p.s.i. lower than the pressure of the conversion zone. The intentional lowering of the pressure causes a flashing of the hydrogen and hydrocarbons contained in the effluent, and a gaseous stream comprising hydrogen and light hydrocarbons is produced. In this mode of operation, hydrogen purity is controlled by the amount the pressure is lowered and/or by cooling the conversion zone effluent. The flash zone liquid is then fractionated in a fractionation zone, typically referred to in the reforming art as a debutanizer or product stabilizer, and a vaporous $C_1$–$C_4$ stream is removed overhead and condensed to produce a liquid fraction containing $C_3$ and $C_4$ hydrocarbons (LPG) and a gaseous fraction comprising $C_1$ and $C_2$ hydrocarbons as well as some $C_3$ and $C_4$ hydrocarbons. In addition, the gaseous fraction will often contain varying amounts of hydrogen which represent the hydrogen not removed in the flash zone vapor. This gaseous fraction removed from the fractionation zone is usually utilized for fuel purposes or simply flared, thereby resulting in an economical loss of $C_3$ and $C_4$ hydrocarbons.

Generally speaking, the described flash separation technique does not produce a relatively pure hydrogen stream (i.e., less than 80% pure). To produce a hydrogen stream of greater purity, the art separates the effluent from a hydrocarbon conversion zone usually after lowering the temperature of the effluent to below 150° F. in a low pressure separator maintained at substantially the same pressure as the pressure of the hydrocarbon conversion zone. This pressure is the same as the conversion zone pressure less only that pressure drop resulting from normal flow losses. This separation produces a gaseous stream comprising hydrogen and normally gaseous hydrocarbons of greater hydrogen purity than obtained by flash separation techniques and a liquid stream comprising normally liquid hydrocarbon and normally gaseous hydrocarbons. While the art often separates the liquid from the low pressure separator in the same manner as the aforedescribed liquid recovered from a flash zone, to produce higher purity hydrogen, the art, prior to the fractionation of the low pressure separator liquid will compress the vapor removed from the low pressure separator to a relatively high pressure, typically about 100 p.s.i. higher than the low pressure separator and will commingle the thus compressed vapor with the low pressure separator liquid. The resultant mixture is again separated in a relatively high pressure separation zone in the same manner as the original effluent was separated in the low pressure separation zone. The vapor phase thus produced is richer in hydrogen and the liquid is fractionated by the described conventional means. In any event, the vapor portion produced by the fractionation of the liquid recovered from the high pressure separation zone is an off-gas stream utilized for flare or fuel uses and the LPG quantity therein is never effectively recovered.

According to the present invention, at least a portion of the vapor fraction (i.e., off-gas stream) produced when the liquid recovered from either a flash separation zone, a low pressure separation zone, a high pressure separation zone or the like, as utilized in the prior art, is fractionated, is passed back to the initial separation zone in which the original hydrocarbon conversion zone effluent was separated. Preferably, 70% to about 90% of this off-gas stream is recycled when the hydrocarbon conversion consumes hydrogen such as hydrocracking and the hydrogen is to be recycled. A 100% off-gas recycle may be used in a hydrogen consuming process but part of the hydrogen would have to be vented to control the level of $C_1$–$C_2$ hydrocarbons, hence raising hydrogen consumption. However, in the case of a hydrogen producing process such as reforming or dehydrogenation 100% recycle is preferred since there is a net hydrogen production. By utilizing this recycle technique, a portion of the $C_3$ and $C_4$ hydrocarbons which would otherwise be lost, if vented, are absorbed in the liquid product which is removed from the respective separation zone and ultimately recovered in the liquefied petroleum gas stream produced by the fractionation zone.

Significant, however, is the fact that when an object of a given separation process is to also produce a relatively pure hydrogen stream, such as the sequence of low pressure-high pressure separations utilized in the prior art scheme described, the recycle of this normally gaseous off stream does not materially affect the purity of the hydrogen recovered. This results since a typical off-gas stream of the type described also contains hydrogen and the recovery of this hydrogen when the off-gas is recycled almost offsets the additional amount of normally gaseous hydrocarbons which might transfer to this relatively pure hydrogen stream. Hence, the presence of this recycle, as it could be called, does not adversely or materially affect hydrogen purity.

DESCRIPTION OF THE DRAWING

The process of the present invention can be most clearly illustrated and described by reference to the attached drawing schematically illustrating the recovery of high octane motor fuel, LPG and hydrogen from the effluent recovered from a conventional catalytic reforming unit for the conversion of a low octane naphtha fraction to a high octane motor fuel. Of necessity, certain limitations must be present in a schematic diagram of the type presented and no intention is made thereby to limit the generally broad scope of this invention to specific feedstocks, flow rates, operating conditions, catalyst, etc. Miscellaneous appurtenances including valves, controllers, pumps, compressors, separators, reboilers, etc., have been eliminated and only those vessels and lines necessary for a complete and clear understanding of various embodiments of this invention are illustrated. Obvious modifications to the process flow made by those possessing expertise in petroleum technology, particularly the art of catalytic reforming and product recovery, are all included within the generally broad scope of the claimed invention.

Referring now to the attached schematic diagram, the effluent from the catalytic reforming unit enters via line 1 and is commingled with a $C_1$–$C_4$ off-gas containing stream, the source of which is to be described later, which enters via line 2. The resultant mixture is passed via line 3 to low pressure separator 4. Low pressure separator 4 is maintained at a temperature of about 100° F. and a pressure of about 230 p.s.i.g. This pressure is substantially the same pressure as that pressure imposed upon the catalytic reforming zone from which the hydrocarbon effluent is obtained, less only that pressure lost due to the flow losses through the system. Low pressure separator is a separator of conventional design for the separation of liquid and vaoprs and produces a vapor stream, removed via line 5, which contains hydrogen and normally gaseous hydrocarbons. This hydrogen containing stream is compressed by compression means 6 to a pressure of about 330 p.s.i.g., with the resultant mixture removed from compressor means 6 via line 22.

Removed from the bottom portion of low pressure separator 4 via line 7, is a liquid stream comprising normally liquid hydrocarbons and $C_1$–$C_4$ gaseous hydrocarbons. This liquid stream is pumped by pumping means 8 through line 7 to the same pressure as the pressure present in line 22, and is commingled and cooled in heat exchange means 8′ to remove the heat produced by the compression of vapor stream 5. The thus cooled mixture is passed via line 22 to high pressure separator 9 which is maintained at a temperature of 100° F. and a pressure of about 330 p.s.i.g.

High pressure separator 9 is a vapor-liquid separator means similar to low pressure separator 4 and produces a hydrogen enriched gaseous stream which is removed via line 10. A portion of this gaseous stream is passed via line 10 as recycle back to the catalytic reforming zone and the remaining portion, removed via line 11, represents the net hydrogen produced in the catalytic reforming zone. Removed via line 12 from high pressure separator 9 is a liquid stream comprising normally liquid hydrocarbons such as gasoline boiling range hydrocarbons and $C_1$–$C_4$ hydrocarbons. This mixture is heated in heat exchange means 13 in a manner to be described later and the thus heated stream is passed via line 12 to fractionation column 14. Fractionation column 14 is a conventional fractionation column for the separation of $C_1$–$C_4$ hydrocarbons from higher boiling range hydrocarbons and is commonly referred to in the art as a stabilizer or product debutanizer. Removed as bottoms via line 15 from fractionation column 14 is a normally liquid stream comprising high quality gasoline boiling range hydrocarbons which is passed to heat exchange means 13 to raise the temperature of the liquid recovered from high pressure separator 9.

Removed overhead from fractionation column 14 via 16, is a vapor fraction comprising $C_1$–$C_4$ hydrocarbons, which also contains, in most instances, residual amounts of hydrogen. This vapor stream is condensed by cooling in heat exchange means 17 and the resultant condensed vapor-liquid mixture is passed via line 16 to receiver 18. Removed via line 19 from the bottom portion of receiver 18 is a liquid stream comprising $C_3$ and $C_4$ hydrocarbons. A portion of this liquid, $C_3$ and $C_4$ hydrocarbon containing stream is passed via line 20 to the upper portion of fractionation column 14 to serve as reflux therein. Removed via line 2 from receiver 18 is a gaseous stream comprising $C_1$ and $C_2$ hydrocarbons in admixture with $C_3$ and $C_4$ hydrocarbons not condensed and removed by line 19. To recover these $C_3$ and $C_4$ hydrocarbons, for illustrative purposes, about 80% of the gas removed from receiver 18 is passed via line 2 and admixed with the catalytic reformer zone effluent as previously described. The remaining portion of the vapors not recycled back to low pressure separator 4 are removed via line 21 and typically utilized as fuel gas.

Referring to the following illustrative embodiment which illustrates compositions of the various streams referred to in the foregoing description of the drawing, the benefits obtained by passing the off-gas produced in receiver 18 to low pressure separator 4 will be more obvious to those trained in the art. It will become apparent that the passage of this off-gas stream to low pressure separator 4 does not materially affect the purity of the hydrogen removed from high pressure separator 9, and that appreciable amounts of $C_3$ and $C_4$ hydrocarbons are recovered. More particularly, the illustrative embodiment illustrates the compositions to be expected both with and without the recycling of the off-gas recovered from receiver 18. All compositions presented are in moles per hour.

| Stream number | Without recycle | | | With 80% recycle | | |
|---|---|---|---|---|---|---|
| | 10 | 19 | 21 | 10 | 19 | 21 |
| Components: | | | | | | |
| $H_2$ | 3,800.00 | 0.17 | 5.03 | 3,800.00 | 0.18 | 1.01 |
| $C_1$ | 362.26 | 0.65 | 3.36 | 377.32 | 0.73 | 0.70 |
| $C_2$ | 228.03 | 4.98 | 6.37 | 254.46 | 5.87 | 1.37 |
| $C_3$ | 128.44 | 14.78 | 7.22 | 147.74 | 17.48 | 1.56 |
| $C_4$ | 60.46 | 19.53 | 4.06 | 65.99 | 21.88 | 0.84 |
| $C_5$ | 22.15 | 0.60 | 0.05 | 22.31 | 0.69 | 0.01 |
| $C_6+$ | 28.30 | | | 28.49 | | |
| Total | 4,629.64 | 40.71 | 26.09 | 4,696.31 | 46.83 | 5.49 |
| Percent $H_2$ | 82.08 | | | 80.92 | | |

From the foregoing illustrative embodiment, the beneficial features of the present invention are self-evident to those trained in the art. Hydrogen purity, while reduced slightly, is at a relatively high level. This slight purity decline is more than offset by the increased amounts of hydrogen and LPG recovered. In the particular instance of reforming, 100% of the gas removed via line 2 could be recycled to low pressure separator 4 and still produce a hydrogen recycle stream of about 80% purity. In a 100% recycle situation, the $C_1$ and $C_2$ hydrocarbons would be removed from the overall process, via line 11 with the net hydrogen gas produced in the process and would not accumulate within the process flow. However, if this was not a hydrogen producing process, 100% recycle would not be practical since there would be no outlet for $C_1$ and $C_2$ hydrocarbons absent a hydrogen make-up stream.

I claim as my invention:

1. A process for the separation of hydrogen, normally gaseous hydrocarbons and normally liquid hydrocarbons from a hydrocarbon conversion zone effluent to recover liquefied petroleum gas, which comprises separating said effluent in a separation zone into a hydrogen stream and a liquid stream containing normally liquid and normally gaseous hydrocarbons, separating said liquid stream into a $C_1$–$C_4$ hydrocarbon gas, a normally liquid hydrocarbon fraction and a liquefied petroleum gas predominating in $C_3$ and $C_4$ hydrocarbons, separately recovering said normally liquid hydrocarbon fraction and said $C_3$–$C_4$ liquefied petroleum gas as products of the process, and commingling at least a portion of said $C_1$–$C_4$ hydrocarbon gas with said effluent being supplied to said separation zone whereby additional amounts of $C_3$ and $C_4$ hydrocarbons are recovered in said liquefied petroleum gas product.

2. The process of claim 1 wherein about 70% to about 90% of the $C_1$–$C_4$ hydrocarbon gas is passed to the separation zone.

3. The process of claim 1 wherein the hydrocarbon conversion zone is a catalytic reforming zone.

4. The process of claim 3 wherein about 100% of the $C_1$–$C_4$ hydrocarbon gas is passed to the separation zone.

5. The process of claim 1 wherein said liquid stream is separated by fractional distillation.

6. In a process for the separation of hydrogen, normally gaseous hydrocarbons and normally liquid hydrocarbons from a hydrocarbon conversion zone effluent to recover liquefied petroleum gas wherein:

(i) the effluent is first separated in a low pressure separation zone maintained at substantially the same pressure as the pressure of the hydrocarbon conversion zone to produce a first gaseous stream comprising hydrogen and normally gaseous hydrocarbons and a first liquid stream comprising normally liquid hydrocarbons and normally gaseous hydrocarbons;

(ii) said first gaseous stream is compressed to a relatively high pressure and admixed with the first liquid stream;

(iii) the resultant mixture is separated in a high pressure separation zone to produce a hydrogen enriched, second gaseous stream and a second liquid stream comprising normally liquid hydrocarbons and normally gaseous hydrocarbons; and, (iv) the second liquid stream is separated to produce a third gaseous stream comprising $C_1$–$C_4$ normally gaseous hydrocarbons, a liquefied petroleum gas stream comprising $C_3$ and $C_4$ hydrocarbons and a normally liquid hydrocarbon stream, the improvement which comprises passing a portion of the third gaseous stream to the low pressure separation zone whereby additional amounts of $C_3$ and $C_4$ hydrocarbons are recovered in the liquefied petroleum gas stream.

7. The improvement of claim 6 wherein about 70% to about 90% of the third gaseous stream is passed to the low pressure separation zone.

8. The improvement of claim 6 wherein the hydrocarbon conversion zone is a catalytic reforming zone.

9. The improvement of claim 8 wherein about 100% of the third gaseous stream is passed to the low pressure separation zone.

10. The improvement of claim 6 wherein the high pressure separation zone is maintained at a pressure at least 50 p.s.i. higher than the low pressure separation zone pressure.

11. The improvement of claim 6 wherein the second liquid stream is separated by fractional distillation.

References Cited
UNITED STATES PATENTS

| | | | |
|---|---|---|---|
| 2,719,816 | 10/1955 | Rich | 208—102 |
| 2,348,681 | 5/1944 | Houghland | 208—351 |
| 3,520,799 | 7/1970 | Forbes | 208—102 |
| 3,520,800 | 7/1970 | Forbes | 208—102 |

HERBERT LEVINE, Primary Examiner

U.S. Cl. X.R.

208—351, 354